(12) United States Patent
Kawabe et al.

(10) Patent No.: US 9,260,549 B2
(45) Date of Patent: Feb. 16, 2016

(54) RESIN FINE POWDER CONSISTING OF 4-METHYL-1-PENTENE POLYMER, COMPOSITION CONTAINING SAME, AND PROCESS FOR PRODUCTION THEREOF

(75) Inventors: Kuniaki Kawabe, Ichihara (JP); Toshiyuki Itou, Ichihara (JP); Mai Kurihara, Sodegaura (JP); Kazutoshi Fujihara, Sodegaura (JP); Ryouichi Seki, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 83 days.

(21) Appl. No.: 13/643,866

(22) PCT Filed: Feb. 8, 2011

(86) PCT No.: PCT/JP2011/000699
§ 371 (c)(1),
(2), (4) Date: Oct. 26, 2012

(87) PCT Pub. No.: WO2011/135763
PCT Pub. Date: Mar. 11, 2011

(65) Prior Publication Data
US 2013/0052464 A1 Feb. 28, 2013

Related U.S. Application Data

(60) Provisional application No. 61/368,420, filed on Jul. 28, 2010.

(30) Foreign Application Priority Data

Apr. 28, 2010 (JP) .................................. 2010-104310

(51) Int. Cl.
*C08F 110/14* (2006.01)
*C04B 38/06* (2006.01)
(Continued)

(52) U.S. Cl.
CPC ........... *C08F 110/14* (2013.01); *C04B 38/0635* (2013.01); *C08J 3/12* (2013.01);
(Continued)

(58) Field of Classification Search
USPC ......................................................... 428/402
See application file for complete search history.

(56) References Cited

U.S. PATENT DOCUMENTS 4,533,781 A * 8/1985 Matsuno et al. .............. 585/516
4,952,649 A 8/1990 Kioka et al.
(Continued)

FOREIGN PATENT DOCUMENTS

CN 1345340 4/2002
CN 1388092 1/2003
(Continued)

OTHER PUBLICATIONS

Translation JP 2002-265719 (2002).*
(Continued)

*Primary Examiner* — Holly Le
(74) *Attorney, Agent, or Firm* — Foley & Lardner LLP

(57) ABSTRACT

A resin fine powder which consists of a 4-methyl-1-pentene polymer that exhibits a limiting viscosity [η] of $1.0 \times 10^{-2}$ to less than 3.0 dl/g as determined in decalin at 135° C. and which has a median particle diameter [$D_{50}$] of $1.0 \times 10^{-1}$ to $5.0 \times 10$ μm; and a composition which comprises the resin fine powder and at least one sinterable powder selected from the group consisting of metal powders and ceramic powders.

6 Claims, 8 Drawing Sheets

(51) Int. Cl.

| | |
|---|---|
| *C08J 3/12* | (2006.01) |
| *C09D 7/12* | (2006.01) |
| *C09D 11/102* | (2014.01) |
| *C09D 123/20* | (2006.01) |
| *C08L 23/20* | (2006.01) |
| *C04B 111/00* | (2006.01) |
| *C08K 3/08* | (2006.01) |
| *C08K 3/34* | (2006.01) |
| *C09D 11/033* | (2014.01) |
| *C09D 11/106* | (2014.01) |

(52) U.S. Cl.
CPC .............. *C08L 23/20* (2013.01); *C09D 7/1216* (2013.01); *C09D 11/102* (2013.01); *C09D 123/20* (2013.01); *C04B 2111/00793* (2013.01); *C08J 2323/20* (2013.01); *C08K 3/08* (2013.01); *C08K 3/34* (2013.01); *C09D 11/033* (2013.01); *C09D 11/106* (2013.01); *Y10T 428/2982* (2015.01)

(56) References Cited

U.S. PATENT DOCUMENTS

| | | | |
|---|---|---|---|
| 4,971,937 A | 11/1990 | Albizzati et al. | |
| 5,744,235 A * | 4/1998 | Creehan | 428/364 |
| 5,874,521 A * | 2/1999 | Shaw | 528/367 |
| 5,948,872 A | 9/1999 | Kioka et al. | |
| 6,369,175 B1 | 4/2002 | Ewen | |
| 6,525,125 B1 | 2/2003 | Giardello et al. | |
| 6,777,508 B1 | 8/2004 | Parodi et al. | |
| 7,160,949 B2 | 1/2007 | Ota et al. | |
| 7,449,533 B2 | 11/2008 | Kawai et al. | |
| 2002/0155776 A1 | 10/2002 | Mitchler et al. | |
| 2002/0193236 A1 | 12/2002 | Takaya et al. | |
| 2003/0140785 A1* | 7/2003 | Koslow | 95/90 |
| 2007/0249792 A1 | 10/2007 | Kawahara et al. | |
| 2008/0044655 A1* | 2/2008 | Nakayama | C08F 10/00 428/402 |
| 2008/0207581 A1* | 8/2008 | Whiteford et al. | 514/183 |
| 2009/0088500 A1* | 4/2009 | Nishimoto et al. | 524/88 |
| 2009/0121202 A1* | 5/2009 | Kempter et al. | 252/586 |
| 2009/0130308 A1* | 5/2009 | Matsumoto et al. | 427/256 |
| 2010/0196711 A1* | 8/2010 | Yasuda et al. | 428/402 |
| 2010/0285348 A1* | 11/2010 | Murata et al. | 429/144 |
| 2012/0094134 A1* | 4/2012 | Enna et al. | 428/474.7 |

FOREIGN PATENT DOCUMENTS

| | | |
|---|---|---|
| CN | 101790547 A | 7/2012 |
| GB | 1 512 730 | 6/1978 |
| JP | 57-063310 A | 4/1982 |
| JP | 58-083006 A | 5/1983 |
| JP | 63-178175 A | 7/1988 |
| JP | 02-041303 A | 2/1990 |
| JP | 03-000706 A | 1/1991 |
| JP | 03-193796 A | 8/1991 |
| JP | 04-218508 A | 8/1992 |
| JP | 05-156028 A | 6/1993 |
| JP | 05-194751 A | 8/1993 |
| JP | 05-088250 B2 | 12/1993 |
| JP | 07-300538 A | 11/1995 |
| JP | 09-328588 A | 12/1997 |
| JP | 2002-265719 A | 9/2002 |
| JP | 2003-105022 A | 4/2003 |
| JP | 2003-160669 A | 6/2003 |
| JP | 3476793 B2 | 12/2003 |
| JP | 2007-031639 A | 2/2007 |
| WO | WO-01/27124 A1 | 4/2001 |
| WO | WO-01/53369 A1 | 7/2001 |
| WO | WO-2005/121192 A1 | 12/2005 |
| WO | WO-2006/054696 A1 | 5/2006 |
| WO | WO-2009/011231 A1 | 1/2009 |

OTHER PUBLICATIONS

Jet Mills, brochure by NSI Equipments, circa 1972.*
International Search Report PCT/JP2011/000699 dated Apr. 19, 2011.
B.B. Kroshkin et al., "Apparatus for Cryogenic Comminution of Recycled Polymer Material", XP002738062, retrieved from STN Database accession No. 1988: 187984.

* cited by examiner

RESIN FINE POWDER CONSISTING OF 4-METHYL-1-PENTENE POLYMER, COMPOSITION CONTAINING SAME, AND PROCESS FOR PRODUCTION THEREOF

TECHNICAL FIELD

The present invention relates to fine resin powders composed of 4-methyl-1-pentene polymers, and compositions containing the same.

BACKGROUND ART

Olefin polymers containing building blocks derived from 4-methyl-1-pentene (hereinafter may also referred to as "4-methyl-1-pentene polymers") are typically produced using so-called Ziegler-Natta catalysts, a class of catalysts composed of transition metal compounds and organoaluminum compounds (see Patent Literature 2). They are also produced using metallocene catalysts, according to some reports (see Patent Literature 1).

As the polymers that exhibit high heat resistance as well as superior transparency, gas permeability, chemical resistance and releasability, 4-methyl-1-pentene polymers are finding a variety of applications, such as in medical devices, heat-resistant wires, heat-resistant dishes, and removers. For their low surface tension, 4-methyl-1-pentene polymers are particularly used in releasing films and waxes (see, e.g., Patent Literature 1).

When 4-methyl-1-pentene polymers are used for these purposes, 4-methyl-1-pentene polymers synthesized in bulk by a polymerization reaction may be used. The bulk polymers may be blended with other resin. In some cases, the bulk polymers or their blend with other resin are pelletized or molded into desired form (e.g., film) where necessary. The bulk polymers may be oligomerized by heating. The oligomers may be blended with other resin or may be molded into desired form. All of these approaches are preferable for reduced production costs.

Powder resins that have a high melting point and low surface tension have heretofore been required in such applications as mixing partners with sinterable powders, more specifically in compositions for porous sintered materials or metallurgical compositions. In some areas, amide resin powders or other powders are chosen as powdery resins to be blended with sinterable powders. Such resin powders, however, have the risk of generating odor when pyrolyzed during a sintering process.

Moreover, machining of resin commonly entails the generation of dust called machining chips. It has been required in the art to make effective use of such machining chips without being disposed of as waste.

CITATION LIST

Patent Literature

PTL 1: WO2005/121192
PTL 2: Japanese Patent Application Laid-Open No. 05-88250

SUMMARY OF INVENTION

Technical Problem

Focusing on their high melting point and low surface tension as well as reduced generation of odor upon pyrolysis, the inventors have studied the possibility of utilizing fine powders of the 4-methyl-1-pentene polymers as fine powdery additives to various compositions. As a result, the inventors have established that 4-methyl-1-pentene polymers can be ground into fine powder by performing a particular pre-treatment. The inventors have also established that 4-methyl-1-pentene polymers of relatively low molecular weights can be ground into fine powder more effectively compared to other olefin polymers.

It is therefore an object of the present invention to provide fine powders of 4-methyl-1-pentene polymers as well as to apply the same as additives to compositions. The present invention also enables the effective use of machining chips of 4-methyl-1-pentene polymers as the source of the fine powders of 4-methyl-1-pentene polymers.

Solution to Problem

Namely, a first aspect of the present invention relates to fine resin powders given below.

[1] A fine resin powder composed of a 4-methyl-1-pentene polymer having an intrinsic viscosity [η] ranging from $1.0 \times 10^{-2}$ to less than 3.0 dl/g as measured in decalin at 135° C., wherein the fine resin powder has a mean particle diameter $D_{50}$ ranging from $1.0 \times 10^{-1}$ to $5.0 \times 10$ μm.

[2] The fine resin powder according to [1], wherein the mean particle diameter $D_{50}$ ranges from $1.0 \times 10^{-1}$ to $1.0 \times 10$ μm.

[3] The fine resin powder according to [1], wherein the intrinsic viscosity [η] ranges from $1.0 \times 10^{-2}$ to less than $5.0 \times 10^{-1}$ dl/g.

[4] The fine resin powder according to [1], wherein the intrinsic viscosity [η] ranges from $5.0 \times 10^{-1}$ to less than 3.0 dl/g.

A second aspect of the present invention relates to compositions and the like given below, which contain the fine resin powders.

[5] A composition including:
(A) 0.1 to 150 weight parts of the fine resin powder according to [1]; and
(B) 100 weight parts of at least one sinterable powder selected from the group consisting of metal powder and ceramic powder.

[6] The composition according to [5], further including (C) 5 to 200 weight parts of a plasticizing binder.

[7] A method of producing a porous sintered body, including:
extrusion molding the composition according to [5] into a molded article; and
sintering the molded article.

[8] The method according to [7], wherein the porous sintered body is a honeycomb filter.

[9] A paint including the fine resin powder according to [1].

[10] An ink including the fine resin powder according to [1].

A third aspect of the present invention relates to methods of producing the fine resin powder given below.

[11] A method of producing the fine resin powder according to [1], including:
jet milling the 4-methyl-1-pentene polymer prepared in bulk or as a coarsely ground product.

[12] The method according to [11], wherein the coarsely ground product is prepared by milling of the 4-methyl-1-pentene polymer permeated with an organic solvent.

[13] The method according to [11], wherein the 4-methyl-1-pentene polymer prepared in bulk or as the coarsely ground product is a pyrolysis product of an 4-methyl-1-pentene polymer.

Advantageous Effects of Invention

A fine resin powder of the present invention is composed of 4-methyl-1-pentene polymer which may exhibit such properties as high melting point, low surface tension, self-lubricity and lubricity, as well as less generation of odor when pyrolyzed. A fine resin powder of the present invention may find wide applications due to these features. Potential applications include additives to various compositions including metallurgical compositions and compositions for ceramics sintered materials, and additives to adhesives and rubbers. In addition to the foregoing features, 4-methyl-1-pentene polymers are transparent and low in density, lending the fine resin powder to be potentially useful also as an additive to ink. The fine resin powder may find many additional applications.

DESCRIPTION OF EMBODIMENTS

Figure 1:
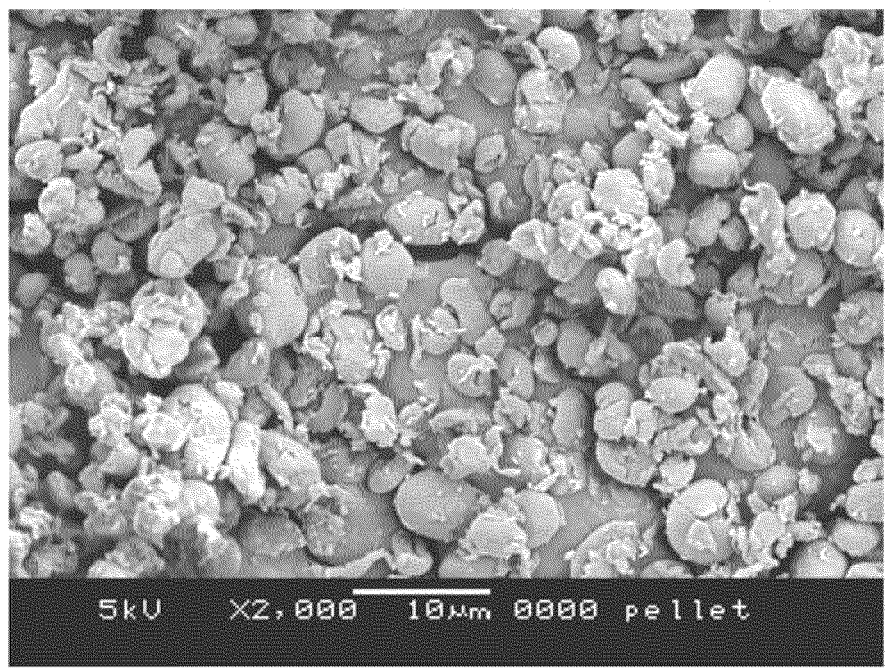
FIG. 1 is an SEM image (×2,000) of fine TPX particles prepared in Example 1.

1. Fine Resin Powder of 4-methyl-1-pentene Polymer

A fine resin powder of the present invention contains a 4-methyl-1-pentene polymer. 4-methyl-1-pentene polymer refers to a polymer having at least one building block derived from 4-methyl-1-pentene.

The proportion of the building blocks derived from 4-methyl-1-pentene, based on the total building blocks of the 4-methyl-1-pentene polymer constituting the fine resin powder of the present invention, ranges preferably from 50 to 100 wt %, more preferably from 60 to 100 wt %, most preferably from 90 to 100 wt %.

In the 4-methyl-1-pentene polymer, the building blocks other than those derived from 4-methyl-1-pentene are preferably derived from $C_{2-20}$ olefin. The proportion of the building blocks derived from $C_{2-20}$ olefin other than 4-methyl-1-pentene, based on the total building blocks of the 4-methyl-1-pentene polymer, ranges preferably from 0 to 50 wt %, more preferably from 0 to 40 wt %, still more preferably from 0 to 30 wt %, most preferably from 0 to 10 wt %.

Examples of the $C_{2-20}$ olefin other than 4-methyl-1-pentene for the building blocks of the 4-methyl-1-pentene polymer include linear or branched α-olefins, cyclic olefins, aromatic vinyl compounds, conjugated dienes, non-conjugated polyenes, and functionalized vinyl compounds.

Specific examples of the linear or branched α-olefins for the building blocks of the 4-methyl-1-pentene polymer include $C_{2-20}$, preferably $C_{2-10}$ linear α-olefins such as ethylene, propylene, 1-butene, 1-pentene, 1-hexene, 1-octene, 1-decene, 1-dodecene, 1-tetradecene, 1-hexadecene, 1-octadecene, and 1-eicosene; and $C_{5-20}$, preferably $C_{5-10}$ branched α-olefins such as 3-methyl-1-butene, 3-methyl-1-pentene, 3-ethyl-1-pentene, 4,4-dimethyl-1-pentene, 4-methyl-1-hexene, 4,4-dimethyl-1-hexene, 4-ethyl-1-hexene, and 3-ethyl-1-hexene.

Specific examples of the cyclic olefins for the building blocks of the 4-methyl-1-pentene polymer include $C_{3-20}$, preferably $C_{5-15}$ cyclic olefins such as cyclopentene, cycloheptene, norbornene, 5-methyl-2-norbornene, tetracyclododecene and vinylcyclohexane.

Specific examples of the aromatic vinyl compounds for the building blocks of the 4-methyl-1-pentene polymer include mono- or poly-alkylstyrenes such as styrene, and α-methylstyrene, o-methylstyrene, m-methylstyrene, p-methylstyrene, o,p-dimethylstyrene, o-ethylstyrene, m-ethylstyrene and p-ethylstyrene.

Examples of the conjugated dienes for the building blocks of the 4-methyl-1-pentene polymer include $C_{4-20}$, preferably $C_{4-10}$ conjugated dienes such as 1,3-butadiene, isoprene, chloroprene, 1,3-pentadiene, 2,3-dimethylbutadiene, 4-methyl-1,3-pentadiene, 1,3-pentadiene, 1,3-hexadiene, and 1,3-octadiene.

Specific examples of the non-conjugated polyenes for the building blocks of the 4-methyl-1-pentene polymer include $C_{5-20}$, preferably $C_{5-10}$ non-conjugated polyenes such as 1,4-pentadiene, 1,4-hexadiene, 1,5-hexadiene, 1,4-octadiene, 1,5-octadiene, 1,6-octadiene, 1,7-octadiene, 2-methyl-1,5-hexadiene, 6-methyl-1,5-heptadiene, 7-methyl-1,6-octadiene, 4-ethylidene-8-methyl-1,7-nonadiene, 4,8-dimethyl-1,4,8-decatriene (DMDT), dicyclopentadiene, cyclohexadiene, dicyclooctadiene, methylene norbornene, 5-vinyl norbornene, 5-ethylidene-2-norbornene, 5-methylene-2-norbornene, 5-isopropylidene-2-norbornene, 6-chloromethyl 5-isopropenyl-2-norbornene, 2,3-diisopropylidene-5-norbornene, 2-ethylidene-3-isopropylidene-5-norbornene, and 2-propenyl-2,2-norbornadiene.

Examples of the functionalized vinyl compounds for the building blocks of the 4-methyl-1-pentene polymer include hydroxy-containing olefins; halogenated olefins; unsaturated carboxylic acids such as acrylic acid, propionic acid, 3-butenoic acid, 4-pentenoic acid, 5-hexenoic acid, 6-heptenoic acid, 7-octenoic, 8-nonenoic acid, and 9-decenoic acid; unsaturated amines such as allylamine, 5-hexeneamine, and 6-hepteneamine; unsaturated acid anhydrides such as (2,7-octadienyl)succinic anhydride, pentapropenyl succinic anhydride, and compounds obtained by replacing carboxylic groups of the foregoing unsaturated carboxylic acids by carboxylic anhydrides groups; unsaturated carboxylic halides such as those obtained by replacing carboxylic groups of the foregoing unsaturated carboxylic acids by carboxylic halide groups; and unsaturated epoxy compounds such as 4-epoxy-1-butene, 5-epoxy-1-pentene, 6-epoxy-1-hexene, 7-epoxy-1-heptene, 8-epoxy-1-octene, 9-epoxy-1-nonene, 10-epoxy-1-decene, and 11-epoxy-1-undecene.

There are no particular limitations on the hydroxy-containing olefins for the building blocks of the 4-methyl-1-pentene polymer as long as they are olefin compounds containing a hydroxy group; examples thereof include hydroxy-terminated olefin compounds. Specific examples of the hydroxy-terminated olefin compounds include $C_{2-20}$, preferably $C_{2-10}$ linear hydroxylated ct-olefins such as vinyl alcohol, allyl alcohol, hydroxylated-1-butene, hydroxylated-1-pentene, hydroxylated-1-hexene, hydroxylated-1-octene, hydroxylated-1-decene, hydroxylated-1-dodecene, hydroxylated-1-tetradecene, hydroxylated-1-hexadecene, hydroxylated-1-octadecene, and hydroxylated-1-eicosene; and $C_{5-20}$, preferably $C_{5-10}$ branched hydroxylated α-olefins such as hydroxylated-3-methyl-1-butene, hydroxylated-4-methyl-1-pentene, hydroxylated-3-methyl-1-pentene, hydroxylated-3-ethyl-1-pentene, hydroxylated-4,4-dimethyl-1-pentene, hydroxylated-4-methyl-1-hexene, hydroxylated-4,4-dimethyl-1-hexene, hydroxylated-4-ethyl-1-hexene, and hydroxylated-3-ethyl-1-hexene.

Specific examples of the halogenated olefins for the building blocks of the 4-methyl-1-pentene polymer include $C_{2-20}$, preferably $C_{2-10}$ linear halogenated a-olefins such as those having atom(s) of the 17th group of the periodic table (e.g., chlorine, bromine or iodine), such as vinyl halide, halogenated 1-butene, halogenated 1-pentene, halogenated 1-hexene, halogenated 1-octene, halogenated 1-decene, halogenated 1-dodecene, halogenated 1-tetradeeene, halogenated 1-hexadecene, halogenated 1-octadecene, and halogenated 1-eicosene; and, preferably $C_{5-20}$, more preferably $C_{5-10}$ branched halogenated α-olefins, such as halogenated 3-methyl-1-butene, halogenated 4-methyl-1-pentene, halogenated 3-methyl-1-pentene, halogenated 3-ethyl-1-pentene, halogenated 4,4-dimethyl-1-pentene, halogenated 4-methyl-1-hexene, halogenated 4,4-dimethyl-1-hexene, halogenated 4-ethyl-1-hexene, and halogenated 3-ethyl-1-hexene.

Particularly preferable examples of the olefins for the building blocks of the 4-methyl-1-pentene polymer, contained together with 4-methyl-1-pentene, include ethylene, propylene, 1-butene, 1-pentene, 1-hexene, 3-methyl-1-butene, 3-methyl-1-pentene, 3-ethyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene, 1-eicosene, vinylcyclohexane, and styrene. The olefins for the building blocks of the 4-methyl-1-pentene polymer other than 4-methyl-1-pentene may be used singly or in combination.

The ratio of weight-average molecular weight (Mw) to number-average molecular weight (Mn) (molecular weight distribution, Mw/Mn) of the 4-methyl-1-pentene polymer of the fine resin powder of the present invention, as measured by gel permeation chromatography (GPC), ranges from 1.0 to 20.0; it may range from 1.0 to 10.0 or from 1.0 to 5.0. Weight-average molecular weight (Mw) and number-average molecular weight (Mn) are both polystyrene equivalent molecular weights measured by GPC. GPC may be carried out at 140° C. using orthodichlorobenzene as a developing solvent.

The lower limit of the melting point (Tm) of the 4-methyl-1-pentene polymer, as measured with a differential scanning calorimeter, is preferably 120° C., more preferably 160° C., still more preferably 180° C., and most preferably 200° C. On the other hand, the upper limit of the melting point (Tm) of the 4-methyl-1-pentene polymer is preferably 245° C., more preferably 240° C., still more preferably 235° C., and most preferably 230° C. Thus, 4-methyl-1-pentene polymers have relatively higher melting points among polyolefin resins. The presence of bulky side chains of 4-methyl-1-pentene polymer, which makes the polymer chains less mobile, is considered to be responsible for their high melting points.

Measurement of melting point is carried out using a differential scanning calorimeter (PerkinElmer Diamond DSC). More specifically, sample (about 5 mg) is loaded into an aluminum sample pan, and then the aluminum pan is heated to 280° C. at a heating rate of 10° C./min, retained at 280° C. for 5 minutes, cooled to 30° C. at a cooling rate of 10° C./min, retained at 30° C. for 5 minutes, and heated to 280° C. at a heating rate of 10° C./min to obtain a DSC curve. An endothermic peak in the DSC curve is defined as the melting point.

The intrinsic viscosity [η] (unit: dl/g) of the 4-methyl-1-pentene polymer, as measured in decalin at 135° C., ranges preferably from $1 \times 10^{-2}$ to 3.0. In some cases, 4-methyl-1-pentene polymers are broadly classified into two groups according to their intrinsic viscosity [η]: The first group consists of 4-methyl-1-pentene polymers of relatively high molecular weight, with intrinsic viscosity [η] ranging from $5 \times 10^{-1}$ to 3.0; and the second group consists of 4-methyl-1-pentene polymers of relatively low molecular weight, with intrinsic viscosity [η] ranging from $1 \times 10^{-2}$ to $5 \times 10^{-1}$.

The critical surface tension of the 4-methyl-1-pentene polymer ranges preferably from 22 to 28 mN/m, more preferably from 23 to 27.5 mN/m, still more preferably from 23.5 to 27.5 mN/m, most preferably from 24.0 to 27.5 mN/m. Critical surface tension depends on the amount of the 4-methyl-1-pentene unit in the 4-methyl-1-pentene polymer. In order for critical surface tension to fall within any of the preferable ranges specified above, the amount of the 4-methyl-1-pentene unit in the 4-methyl-1-pentene polymer ranges preferably from 60 to 100 wt %, more preferably from 70 to 100 wt %, most preferably from 80 to 100 wt %. A fine resin powder of a 4-methyl-1-pentene polymer having a critical surface tension falling within any of these ranges can enhance the flowability of a powder composition in which it is contained.

The 4-methyl-1-pentene polymers can be directly prepared by polymerization of the olefins. Examples of suitable polymerization catalysts used for the polymerization include magnesium-supported titanium catalysts such as those described in JP-A Nos. 57-63310, 58-83006, 03-706, 04-218508 and 2003-105022 and JP-B No. 3476793; and metallocene catalysts such as those described in WO01/53369, WO01/27124 and JP-A Nos. 03-193796 and 02-41303. Among magnesium-supported titanium catalysts, those containing polyether as an electron donor are particularly preferable as they tend to provide a polymer having a relatively narrow molecular weight distribution.

As described above, 4-methyl-1-pentene polymers to be contained in resin compositions of the present invention may also be prepared using metallocene catalysts. Olefin polymerization catalysts that include metallocene compounds having the following formula (1) or (2) are suitable as the metallocene catalysts.

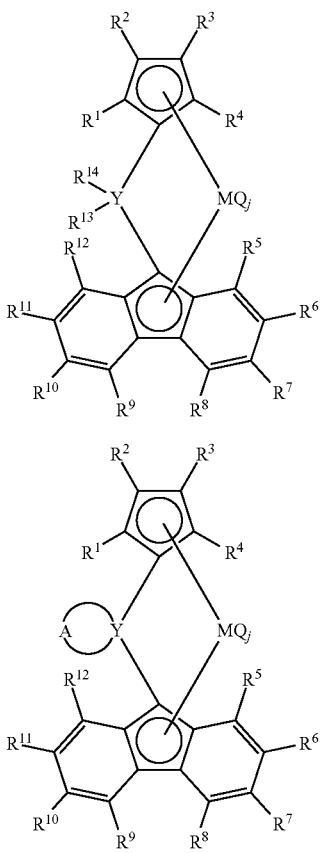

In general formulas (1) and (2), $R^1$, $R^2$, $R^3$, $R^4$, $R^5$, $R^6$, $R^7$, $R^8$, $R^9$, $R^{10}$, $R^{11}$, $R^{12}$, $R^{13}$ and $R^{14}$, which may be identical or different, are selected from hydrogen, hydrocarbon group and silicon-containing hydrocarbon group; two adjacent groups selected from $R^1$ to $R^4$ may be joined together to form a ring; and two adjacent groups selected from $R^5$ to $R^{12}$ may be joined together to form a ring.

In general formula (2), A is $C_{2\text{-}20}$ divalent hydrocarbon group which may have a unsaturated bond and/or aromatic ring; and A may have two or more ring systems, including a ring formed together with Y.

In general formulas (1) and (2), M is a metal selected from elements of the 4th group of the periodic table; Y is carbon or silicon; Q may be selected from halogen, hydrocarbon group, anionic ligand and neutral ligand capable of coordinating with a lone electron pair; when more than one Q appears, they are identical or different; and j is an integer of 1 to 4.

Preferable examples of the hydrocarbon group represented by $R^1$ to $R^{14}$ in general formulas (1) and (2) include $C_{1\text{-}20}$ alkyl group, $C_{7\text{-}20}$ arylalkyl group, $C_{6\text{-}20}$ aryl group and $C_{7\text{-}20}$ alkylaryl group, each of which may have one or more ring systems. Specific examples thereof include methyl, ethyl, n-propyl, isopropyl, 2-methylpropyl, 1,1-dimethylpropyl, 2,2-dimethylpropyl, 1,1-diethylpropyl, 1-ethyl-1-methylpropyl, 1,1,2,2-tetramethylpropyl, sec-butyl, tert-butyl, 1,1-dimethylbutyl, 1,1,3-trimethylbutyl, neopentyl, cyclohexyl methyl, cyclohexyl, 1-methyl-1-cyclohexyl, 1-adamantyl, 2-adamantyl, 2-methyl-2-adamantyl, menthyl, norbornyl, benzyl, 2-phenylethyl, 1-tetrahydronaphthyl, 1-methyl-1-tetrahydro naphthyl, phenyl, naphthyl, and tolyl.

Preferable examples of the silicon-containing hydrocarbon group represented by $R^1$ to $R^{14}$ in general formulas (1) and (2) include alkylsilyl or arylsilyl group having 1 to 4 silicon atoms and 3 to 20 carbon atoms. Specific examples thereof include trimethylsilyl, tert-butyldimethylsilyl, and triphenylsilyl.

In general formulas (1) and (2), $R^1$ and $R^3$ are preferably hydrogen, and $R^2$ is preferably a hydrocarbon group or silicon-containing hydrocarbon group. $R^2$ is more preferably a bulky substituent, most preferably a substituent having 4 or more carbon atoms.

In general formulas (1) and (2), two adjacent groups selected from $R^5$ to $R^{12}$ attached to the fluorene ring may be joined together to form a ring. That is, the substituted fluorenyl group in general formulas (1) and (2) may be benzofluorenyl, dibenzofluorenyl, octahydrodibenzofluorenyl or octamethyloctahydrodibenzofluorenyl.

For easy synthesis, the substituents $R^5$ to $R^{12}$ on the fluorene ring in general formulas (1) and (2) are preferably axisymmetrical, i.e., $R^5$=$R^{12}$, $R^6$=$R^{11}$, $R^7$=$R^{10}$, and $R^8$=$R^9$. Specifically, the fluorenyl group in general formuals (1) and (2) is preferably non-substituted fluorenyl, 3,6-di-substituted fluorenyl, 2,7-di-substituted fluorenyl, or 2,3,6,7-tetra-substituted fluorenyl (where the 3-, 6-, 2- and 7-positions on the fluorene ring correspond to $R^7$, $R^{10}$, $R^6$ and $R^{11}$, respectively).

$R^{13}$ and $R^{14}$ in general formula (1) is selected from hydrogen and hydrocarbon group, and may be identical or different. Specific preferable examples of the hydrocarbon group are the same as those for $R^1$ to $R^{14}$.

Y in general formula (1) is carbon or silicon, forming bonds to $R^{13}$ and $R^{14}$ to form a substituted methylene group or substituted silylene group as a linking moeity. Specific preferable examples of the substituted methylene group include methylene, dimethylmethylene, diisopropylmethylene, methyltert-butylmethylene, dicyclohexylmethylene, methylcyclohexylmethylene, methylphenylmethylene, diphenylmethylene, methylnaphthylmethylene, and dinaphthylmethylene. Specific preferable examples of the substituted silylene group include dimethylsilylene, diisopropylsilylene, methyltert-butylsilylene, dicyclohexylsilylene, methylcyclohexylsilylene, methylphenylsilylene, diphenylsilylene, methylnaphthyl silylene, and dinaphthylsilylene.

Y in general formula (2) is carbon or silicon, forming bonds to $C_{2\text{-}20}$ divalent hydrocarbon group A which may have a unsaturated bond and/or aromatic ring, to form, for example, cycloalkylidene group or cyclomethylenesilylene group. Specific preferable examples of the cycloalkylidene group include cyclopropylidene, cyclobutylidene, cyclopentylidene, cyclohexylidene, cycloheptylidene, bicyclo[3.3.1]nonylidene, norbornylidene, adamantylidene, tetrahydronaphthylidene, and dihydroindanylidene. Specific preferable examples of the cyclomethylenesilylene group include cyclodimethylenesilylene, cyclotrimethylenesilylene, cyclotetramethylenesilylene, cyclopentamethylenesilylene, cyclohexamethylenesilylene, and cycloheptamethylenesilylene.

M in general formulas (1) and (2) is a metal element selected from elements of the 4th group of the periodic table, and may be titanium, zirconium or hafnium, for example.

Q in general formulas (1) and (2) are selected from halogen, $C_{1\text{-}20}$ hydrocarbon group, anionic ligand, and neutral ligand capable of coordinating with a lone electron pair; when more than one Q appears, they are identical or different. Specific examples of the halogen include fluorine, chlorine, bromine, and iodine. Specific examples of the hydrocarbon group are the same as those represented by $R^1$ to $R^{14}$. Specific examples of the anionic ligand include alkoxy groups such as methoxy, tert-butoxy and phenoxy; carboxylate groups such as acetate and benzoate; and sulfonate groups such as mesylate and tosylate. Specific examples of the neutral ligand capable of coordinating with a lone electron pair include organophosphorous compounds such as trimethylphosphine, triethylphosphine, triphenylphosphine, and diphenylmethylphosphine; and ethers such as tetrahydrofuran, diethylether, dioxane, and 1,2-dimethoxyethane. Qs may be identical or different, but at least one of them is preferably halogen or alkyl group.

Specific examples of the metallocene compounds suitably used in the present invention include, without limitation, compounds exemplified in WO01/27124. Among the metallocene compounds described above, the metallocene compounds having general formula (1) are preferable from the viewpoint of molecular weight distribution and terminal structure of the obetained polymer.

As described above, 4-methyl-1-pentene polymers to be contained in resin compositions of the present invention may be prepared using metallocene catalysts. Catalyst compositions for the preparation preferably contain the following components.

Component (i): the metallocene compound having general formula (1) or (2);

Component (ii): at least one compound selected from (ii-1) organometal compound, (ii-2) organoaluminumoxy compound, and (ii-3) compound that undergoes reaction with the metallocene compound to form an ion pair; and Component (iii): fine particulate carrier (optional).

These catalyst compositions have heretofore been used in the art, as disclosed in, for example, WO01/27124.

Polymerization to prepare 4-methyl-1-pentene polymers using metallocene catalysts may be carried out by liquid-phase polymerization (e.g., solution polymerization or suspension polymerization) or by gas-phase polymerization. For liquid-phase polymerization, inert hydrocarbon solvents may be employed; specific examples thereof include aliphatic hydrocarbons such as propane, butane, pentane, hexane, heptane, octane, decane, dodecane, and kerosene; alicyclic hydrocarbons such as cyclopentane, cyclohexane, and methylcyclopentane; aromatic hydrocarbons such as benzene, toluene, and xylene; halogenated hydrocarbons such as ethylenechloride, chlorobenzene, and dichloromethane; and mixtures of the foregoing. Additionally or alternatively, olefins themselves including 4-methyl-1-pentene, which are the monomers to be polymerized, may be used as a solvent.

The amount of component (1) is typically set to range from $10^{-8}$ to $10^{-2}$ mol, preferably from $10^{-7}$ to $10^{-3}$ mol, per 1 L polymerization reaction volume.

In the catalyst composition, the mole ratio of component (ii-1) to transition metal atom (M) in component (i), [(ii-1)/M], is typically set to range from 0.01 to 5,000, more preferably from 0.05 to 2,000. In the catalyst composition, the mole ratio of aluminum atom in component (ii-2) to transition metal atom (M) in component (i), [(ii-2)/M], is typically set to range from 10 to 5,000, more preferably from 20 to 2,000. In the catalyst composition, the mole ratio of component (ii-3) to transition metal atom (M) in component (i), [(ii-3)/M], is typically set to range from 1 to 10, more preferably from 1 to 5.

Polymerization temperature used to prepare 4-methyl-1-pentene polymers using metallocene catalysts typically ranges from −50° C. to 400° C., preferably from 10° C. to 300° C., more preferably from 10° C. to 250° C. Too low polymerization temperature results in reduced polymerization activity per catalyst quantity, which is undesirable for industrial purposes.

Polymerization pressure typically ranges from atmospheric pressure to 10 MPa gauge pressure, preferably from atmospheric pressure to 5 MPa gauge pressure. The polymerization reaction may be carried out batchwise, semi-continuously or continuously. Moreover, the polymerization may be carried out in two or more stages of different reaction conditions.

Introduction of hydrogen gas in the polymerization reaction system allows for control of polymerization activity as well as adjustment of the molecular weight and/or intrinsic viscosity [η] of the resultant 4-methyl-1-pentene polymer. An appropriate amount of hydrogen gas to be introduced ranges from about 0.001 to about 100,000 NL per kg of olefin.

4-methyl-1-pentene polymers of relatively low molecular weight may be directly prepared by polymerization of the olefins or may be prepared by pyrolysis of 4-methyl-1-pentene polymers of relatively high molecular weight, which have been prepared by polymerization. The pylolyzed 4-methyl-1-pentene polymers may be subjected to solvent fractionation (fractionation based on differential solubility in different solvents) or molecular distillation (fractionation based on differential boiling point).

The conditions for pyrolysis of base 4-methyl-1-pentene polymers to be pylolyzed (pyrolysis temperature and pyrolysis time) are appropriately determined according to desired molecular weight and/or intrinsic viscosity [η] after pyrolysis. Pyrolysis temperature typically ranges from 150° C. to 450° C., preferably from 250° C. to 440° C., most preferably from 350° C. to 430° C. Pyrolysis time typically ranges from 5 to 300 minutes, preferably from 10 to 240 minutes, more preferably from 15 to 180 minutes.

The mean particle diameter $D_{50}$ of a fine resin powder of the present invention is preferably 50 μm or less; it can be reduced to 20 μm or less, and further to 10 μm or less. More specifically, the lower limit of the $D_{50}$ is preferably $1.0 \times 10^{-1}$ μm, more preferably $5.0 \times 10^{-1}$ μm, still more preferably $7.0 \times 10^{-1}$ μm, most preferably 1.0 μm. On the other hand, the upper limit of the $D_{50}$ is preferably $5.0 \times 10$ μm, more preferably $3.0 \times 10$ μm, still more preferably $1.0 \times 10$ μm, most preferably 5.0 μm.

The mean particle diameter $D_{50}$ of the fine resin powder is measured with a laser diffraction particle size distribution analyzer. Specifically, the fine resin powder is dispersed into a dispersing solvent, the sample is measured for particle size distribution based on the laser diffraction/scattering method, and a mean particle diameter $D_{50}$ is calculated based on the particle size distribution obtained. Mean particle diameter $D_{50}$ is the median particle diameter at 50% in the cumulative distribution curve, i.e., the median particle diameter divides the particle population into two halves, one half having 50 wt % of the particle population and having larger diameters than the median particle diameter, and the other half having 50 wt % of the particle population and having smaller diameter than the median particle diameter.

A fine resin powder prepared by milling of a 4-methyl-1-pentene polymer resin bulk tends to have a small mean particle diameter $D_{50}$. Moreover it tends to have a relatively narrow particle size distribution, particularly low proportions of coarse particles. These tendencies are considered to be attributed to the features of 4-methyl-1-pentene polymers, such as the presence of relatively more bulky side chains, relatively lower atomic packing density, and relatively small intermolecular force compared to other polyolefin resins. High glass transition temperature and rigidity due to the less mobility of the molecular chains of 4-methyl-1-pentene polymers may also be responsible for these tendencies.

A fine resin powder of the present invention shows high flowability despite relatively small particle diameter. High flowability means, for example, a small angle of repose. For example, a fine resin powder of the present invention shows a smaller angle of repose than a polyethylene powder of the same size. Angle of repose is measured in accordance with JIS R9301.

Since 4-methyl-1-pentene polymers have a low intermolecular force as described above, a fine resin powder of 4-methyl-1-pentene polymer has a small critical surface tension on the powder surface. Thus, a fine resin powder of the present invention exhibits superior releasability and self-lubricity, and therefore, the fine resin powder of 4-methyl-1-pentene polymer has a high flowability.

A fine resin powder of the present invention is provided in the form of dry powder by milling. Specifically, the fine resin powder of the present invention distinguishes over powdery resin particles prepared by polymerization of a monomer in solvent, such as by emulsion polymerization.

2. Method of Production of Fine Resin Powder of 4-methyl-1-pentene Polymer

A method of the present invention for producing a fine resin powder of 4-methyl-1-pentene polymer is broadly classified into two types: One method is jet milling of high-molecular weight 4-methyl-1-pentene polymers, which can be preceded with any desired pre-treatment; and the other method is jet milling of low-molecular weight 4-methyl-1-pentene polymers.

High-molecular weight 4-methyl-1-pentene polymers generally refer to 4-methyl-1-pentene polymers having an intrinsic viscosity [η] ranging from $5 \times 10^{-1}$ to less than 3.0 dl/g. Ground products of 4-methyl-1-pentene polymers having a intrinsic viscosity [η] ranging from $5 \times 10^{-1}$ to less than 3.0 dl/g are less tacky and therefore offer good handleability. Nevertheless, such high-molecular weight 4-methyl-1-pentene polymers are generally hard to be ground into fine powder, particularly into fine powder having a narrow particle size distribution (e.g., $D_{50} \leq 50$ μm). To overcome this drawback, high-molecular weight 4-methyl-1-pentene polymers are subjected to pre-treatment to put the same in condition for jet milling.

For the pre-treatment of high-molecular weight 4-methyl-1-pentene polymers, one or more appropriate treatments selected from cutter milling, sieving, and solvent treatment are preferably carried out according to the type of the raw material used.

By cutter milling, high-molecular weight 4-methyl-1-pentene polymers are coarsely ground. The coarsely ground product preferably has a $D_{50}$ of around 100 μm or less. High-molecular weight 4-methyl-1-pentene polymers in pellet form, for example, are preferably coarsely ground by cutter milling. Cutter milling may be carried out using a cutter mill.

By sieving, a powder of high-molecular weight 4-methyl-1-pentene polymer has a sharp particle size distribution. The mesh size of a filter used for sieving is preferably 1,000 μm or less. The sieved powder preferably has a $D_{50}$ of around 100 μm or less. For example, machining chips (dust) generated by machining of pellets of high-molecular weight 4-methyl-1-pentene polymers include fine powder as well as coarse powder. Accordingly, sieving is preferably performed to obtain only fine powder.

Solvent treatment is the process in which 4-methyl-1-pentene polymers are permeated with solvent; it is typically carried out by immersing the polymer into solvent. Examples of the solvent include aliphatic hydrocarbons such as n-hexane, methylcyclohexane, decane, and decaline; ethers such as tetrahydrofuran; and halogenated hydrocarbons such as dichloromethane and chloroform. Immersion time in solvent typically ranges from 30 minutes to 24 hours; immersion time of 3 to 4 hours often suffices. The temperature of the solvent for immersion may be normal temperature and may be higher or lower than normal temperature. Solvent treatment may be carried out as a pre-treatment for cutter milling or for jet milling.

Jet milling of a 4-methyl-1-pentene polymer subjected to pre-treatment yields a fine resin powder of the present invention. The particle diameter of the jet-milled product decreases with decreasing throughput of jet milling (i.e., volume of raw material to be ground per unit time); however, it results in low productivity. On the other hand, the particle diameter of the jet-milled product increases with increasing throughput of jet milling, resulting in high productivity.

Jet milling may be carried out using a ultrafine grinding machine; for example, NanoJetmizer (Aishin Nano Technologies, Co., Ltd.) can be used. Jet milling may be performed once or, where necessary, repeated several times.

Low-molecular weight 4-methyl-1-pentene polymers generally refer to 4-methyl-1-pentene polymers having an intrinsic viscosity [η] ranging from $1.0 \times 10^{-2}$ to less than $5.0 \times 10^{-1}$ dl/g. Low-molecular weight 4-methyl-1-pentene polymers are more easily ground into fine powder compared to high-molecular weight counterparts. For this reason, low-molecular weight 4-methyl-1-pentene polymers may or may not be subjected to pre-treatment to put the same in condition for jet milling.

Low-molecular weight 4-methyl-1-pentene polymers can be prepared by pyrolysis of high-molecular weight 4-methyl-1-pentene polymers, but can also be prepared by polymerization of monomers.

Low-molecular weight 4-methyl-1-pentene polymers may be jet-milled in the same manner as high-molecular weight counterparts. Low-molecular weight 4-methyl-1-pentene polymers are easily jet-milled compared to other polyolefins (e.g., polyethylene and polypropylene) due to their high glass transition temperature (Tg).

3. Composition Containing Fine Resin Powder of 4-methyl-1-pentene Polymer

A fine resin powder of 4-methyl-1-pentene of the present invention may find a variety of applications as, for example, additives to various compositions including ink compositions, paint compositions, metallurgical powder compositions and compositions for ceramics sintered materials; additives to adhesives and rubbers; releasing agents for toner; and mold releasing agents.

A fine resin powder of 4-methyl-1-pentene of the present invention may also find applications as resin additives to shafts, gears, cams, electric parts, camera parts, automobile parts, household articles, or as resin additives for waxes, greases, engine oils, fine ceramics, and plating.

One preferable example of a composition of the present invention contains the above-described fine resin powder, and at least one sinterable powder selected from the group consisting of metal powder and ceramics powder. The amount of the fine resin powder ranges from 0.1 to 150 weight parts per 100 weight parts of the sinterable powder, more preferably from 5 to 150 weight parts, still more preferably from 10 to 100 weight parts, most preferably from 15 to 85 weight parts. When the fine resin powder content is too small, the composition may become less moldable due to reduced self-lubricity, or the resultant molded or sintered article becomes hard to be separated from the mold (i.e., releasability may decrease). On the other hand, when the fine resin powder content is too large, not only the composition's releasability and self-lubricity may reach a plateau, but a desired sintered article may be hard to be obtained due to reduced compressibility.

Composition for Porous Sintered Material

A composition of the present invention for porous sintered material contains a fine resin powder of the present invention, a ceramic powder or metal powder, and a plasticizing binder. A porous sintered material can be prepared from the composition of the present invention for porous sintered material. The porous sintered material is, for example, a honeycomb filter. The honeycomb filter is used as, for example, a catalyst carrier for automobile catalytic converters, or as a catalyst carrier for purifying exhaust gas from diesel engines.

The ceramic powder or metal powder is the constituent material of the porous sintered article. Examples of the ceramic powder include cordierite, spinel, clay, talc, alumina, aluminum hydroxide, silica, calcium oxide, magnesium oxide, boron oxide, titanium oxide, germanium oxide, alkali, and transition metals. Examples of the metal powder include powders containing iron, tungsten, copper, bronze, molybdenum, chromium or nickel as a principal component.

In many cases, the plasticizing binder is composed of thermoplastic resin such as ethylene-vinylacetate copolymer, cellulose or derivative thereof, surfactant (e.g., stearic acid or oleic acid), oil, water, and so forth. There are no particular limitations on the amount of the plasticizing binder in the composition for porous sintered material; the amount ranges preferably from 5 to 200 weight parts per 100 weight parts of the sinterable powder, more preferably from 30 to 160 weight parts, most preferably from 40 to 100 weight parts. For example, the composition contains 2 to 25 weight parts of cellulose or derivative thereof, 0.5 to 10 weight parts of surfactant, 2-25 weight parts of oil, and 30 to 100 weight parts of water, per 100 parts weight of the ceramic powder.

The amount of the fine resin powder in the composition for porous sintered material ranges from 5 to 150 weight parts per 100 weight parts of the ceramic powder, preferably from 10 to 100 weight parts, and may range most preferably from 15 to 85 weight parts. In the composition for porous sintered material, the fine resin powder of the present invention serves as a pore former that forms fine pores in the sintered material manufactured.

A sintering process by which a porous sintered body is manufactured may include the steps of: 1) forming a green body by allowing a composition for porous sintered material to pass through an extrusion die; 2) heating the green body to disperse a pore former; and 3) sintering the green body from which the pore former was dispersed. Specifically, gasification or decomposition of the fine resin powder upon heating of the green body results in the formation of pores in the ceramic sintered material.

Spherical grains of the composition of the present invention for porous sintered material are densely packed during the green body formation process and therefore can be readily caught by the kneader screw during kneading. The fine resin powder of the present invention also functions as a lubricant for the raw material powder (metal powder or ceramic powder). As a result, the composition of the present invention for porous sintered material is uniformly kneaded in short time.

As described above, the fine resin powder of the present invention is composed of 4-methyl-1-pentene polymer which has a low temperature of starting decomposition than other polyolefins such as polyethylene. For this reason, the 4-methyl-1-pentene polymer can be removed even when the green body is heated at low temperatures.

When melting of a pore former occurs at low temperatures during heating of the green body for the removal of the pore former, the green body may deform due to its own weight. On the other hand, the fine resin powder of the present invention has a high melting point and therefore resists melting during heating of the green body. Thus, unwanted deformation of the green body during heating can be prevented.

The lower limit of the $D_{50}$ of the pore former in the composition for porous sintered material is preferably $1.0 \times 10^{-1}$ µm, more preferably $5.0 \times 10^{-1}$ µm, still more preferably $7.0 \times 10^{-1}$ µm, most preferably 1.0 µm. This is because excessively small particles may fail to form pores in the sintered body. On the other hand, the upper limit of the $D_{50}$ of the pore former is preferably $5.0 \times 10$ µm, more preferably $3.0 \times 10$ µm, still more preferably $1.0 \times 10$ µm, most preferably 5.0 µm. Excessively large particle size may fail to provide the porous sintered body with sufficient strength.

Metallurgical Composition

A metallurgical composition of the present invention contains a fine resin powder of the present invention, and a sinterable powder. From the metallurgical composition, for example, a metal member, which is a sintered body, can be manufactured.

The sinterable powder is the constituent material of the resultant sintered body. The sinterable powder is generally ceramic powder or metal powder. Examples of the metal powder include powders containing iron, tungsten, copper, bronze, molybdenum, chromium or nickel as a principal component. The weight-average particle diameter of the sinterable powder is preferably 1,000 µm at most; it generally ranges from 10 to 500 µm, preferably from 20 to 350 µm, most preferably from 30 to 150 µm. The amount of the sinterable powder in the metallurgical composition ranges preferably from 85 to 99.9 wt %, more preferably from 95 to 99.8 wt %, most preferably from 98 to 99.7 wt %. The fine resin powder content in the metallurgical composition ranges preferably from 0.1 to 15 wt %, more preferably from 0.2 to 5 wt %, most preferably from 0.3 to 2 wt %. A metallurgical composition being deficient in the fine resin powder exhibits insufficient lubricity. On the other hand, excessive amount in the fine resin powder results not only in lubricity reaching a plateau, but also reduced compressibility. It should be noted that in the metallurgical composition, the fine resin powder of the present invention functions as a dry lubricant.

The metallurgical composition can be prepared by adding an appropriate amount of the fine resin powder to a sinterable powder and mixing the two powders using a mixer. Suitable mixers include those that apply a small shearing force to mixed powder, such as container mixers, mechanical mixers, flow mixers, and static mixers. Preferable container mixers are horizontal cylindrical mixers, tilted cylindrical mixers, V-shape mixers, double-cone mixers, and continuous V-shape mixers; container mixers equipped with an impeller are also suitable. Preferable mechanical mixers are ribbon mixers, screw mixers, pug mill mixers, cone screw mixers, and rotating disc mixers. Preferable flow mixers are fluidized bed mixers, circulation flow mixers, and jet-pump mixers.

A metallurgical process may include the steps of: 1) loading a metallurgical composition, mixed in the manner described above, into a sintering mold, followed by compression molding; 2) separating the compression-molded article from the mold; and 3) heating and sintering the molded article.

Loading and compression molding of the metallurgical composition in a sintering mold may be carried out using any of the methods known in the art. For example, loading and compression of the metallurgical composition of room temperature inside a mold that is pre-heated to 50° C. to 70° C. is suitable because of easy handling of powder and enhanced packing density of the compressed powder. Alternatively, warm compaction may be employed in which the metallurgical composition and mold are both heated to 100° C. to 150° C.

Heating and sintering may be carried out using any of the methods known in the art.

The dry lubricant is required to cause, upon compression molding of the metallurgical composition in a sintering mold, the sinterable powder to flow and explore the entire cavity of the mold. Moreover, the dry lubricant is required to enhance releasability with which a compression-molded article is separated from the mold. With the aid of the dry lubricant, a precisely-shaped compression-molded article can be formed. The fine resin powder of the present invention is a fine powder of 4-methyl-1-pentene polymer having a low surface tension and, therefore, can cause flowing of the sinterable powder and facilitate separation of the molded article from the mold.

There have been cases where metallurgical compositions formulated with dry lubricants having low melting points have low flowability of sinterable powder due to the formation of liquid bridges between particles of the sinterable powder. This flowability reduction is significant particularly where the metallurgical composition and sintering mold are both heated, upon loading of the metallurgical composition in the mold. To avoid this, there have been cases where metallurgical compositions are formulated with dry lubricants having high melting points—for example higher fatty acid metal salts or ethylene-bis-amide. However, additions of such dry lubricants are insufficient in terms of improving flowability of the sinterable powder.

The lower limit of the $D_{50}$ of the fine resin powder in the metallurgical composition is preferably $1.0 \times 10^{-1}$ μm, more preferably $5.0 \times 10^{-1}$ μm, still more preferably $7.0 \times 10^{-1}$ μm, most preferably 1.0 μm. On the other hand, the upper limit of the $D_{50}$ is preferably $5.0 \times 10$ μm, more preferably $3.0 \times 10$ μm, still more preferably $1.0 \times 10$ μm, most preferably 5.0 μm. Excessively large particle size results in reduced strength in the sintered body. On the other hand, excessively small particle size results in failure to enhance the flowability of the sinterable powder in the metallurgical composition to a sufficient level.

The dry lubricant contained in the metallurgical composition needs to be removed by pyrolysis during sintering of the molded article. The fine resin powder of the present invention is a fine powder of 4-methyl-1-pentene polymer which has a low temperature for starting decomposition than other polyolefins such as polyethylene. Thus, the dry lubricant may be removed more reliably at lower sintering temperatures. While there are cases where amide waxes or other waxes, which are sometimes used as dry lubricants for metallurgical compositions, generate upon pyrolysis odor substance that reduces the working efficiency, the fine resin powder of the present invention is less prone to generate such odor substance.

Some portion of the fine resin powder contained in the metallurgical composition may be fine resin powder other than the fine resin powder of the present invention. Examples of the resin fine powder other than that of the present invention include powders of fatty acid metal salts and amide waxes: specific examples thereof include fatty acid metal salts such as lithium stearate, calcium stearate and zinc stearate, and amide waxes such as ethylene-bis-stearoylamide based wax and stearoylamide based wax.

Ink Composition/Paint Composition

An ink composition and a paint composition of the present invention each contain the fine resin powder of the present invention, a matrix resin, an organic solvent, and a colorant. The ink composition may be used for offset printing, for example.

Examples of the matrix resin include natural resins such as rosin, gilsonite and rosin ester; and synthetic resins such as phenol resins alkyd resins, petroleum resins, vinyl resins, polyamide resins, acrylate resins, cellulose nitrate, and chlorinated rubber.

Examples of the organic solvent include aromatic hydrocarbons such as benzene, toluene, and xylene; aliphatic hydrocarbons such as hexane, octane, and decane; alicyclic hydrocarbons such as cyclohexane, cyclohexene, methylcyclohexane, and ethylcyclohexane; halogenated hydrocarbons such as trichloroethylene, dichloroethylene, and chlorobenzene; alcohols such as methanol, ethanol, isopropyl alcohol, butanol, pentanol, hexanol, propanediol, and phenol; ketones such as acetone, methyl isobutyl ketone, methyl ethyl ketone, pentanone, hexanone, isophorone, and acetophenone; cellosolves such as methyl cellosolve and ethyl cellosolve; esters such as methyl acetate, ethyl acetate, butyl acetate, methyl propionate, and butyl formate; and ethers such as tetrahydrofuran.

The amount of the fine resin powder of the present invention in the ink composition and paint composition ranges preferably from 0.1 to 10 wt %. In the ink composition and paint composition, the fine resin powder of the present invention functions as a wax.

The wax contained the ink composition and paint composition serves to increase the rub resistance of the coating. For example, there are cases where coatings from ink compositions and paint compositions exhibit poor quality due to rubbing the coating with other members; the wax can prevent print quality reduction.

In offset printing, where prints are produced by evaporating the solvent in ink coatings by heating (heat setting), heating temperature (heat-set temperature) rises as high as, for example, 150° C. or above in some cases. Thus, there have been cases where general-purpose wax melts during the heating process of ink coatings, resulting in loss of rub resistance.

The fine resin powder of the present invention is a fine powder of 4-methyl-1-pentene polymer having a higher melting point (150° C. or above, preferably 180° C. or above, more preferably 200° C. or above) than polyethylene or other resin, which is used as a wax. Thus, the ink composition and paint composition containing the fine resin powder of the present invention provide coatings having high rub resistance, and yet may enhance the rub resistance even for coatings that are printed by offset printing that uses high heat-set temperatures.

The 4-methyl-1-pentene polymers for the resin fine powder of the present invention have high transparency. Thus, the fine resin powder of the present invention is less likely to affect the hue of the print and therefore has less negative impact on print quality.

Moreover, the 4-methyl-1-pentene polymers for the resin fine powder of the present invention also have low density. Thus, the resin fine powder of the present invention may be localized at the surface of coatings made of the ink composition or paint composition. Localization of wax at the coating surface can enhance the rub resistance of the coating.

EXAMPLES

Example 1

A pellet of poly(4-methyl-1-pentene) (Mitsui Chemicals, Inc., trade name: TPX, brand name: DX820, melting point: 233° C., MFR: 180 [g/10 min] (ASTM-D1238, 260° C., 5 kg load) was prepared (particle diameter: about 3 mm).

The pellet was subjected to solvent treatment by immersing the same into methylcyclohexane of room temperature for 4 hours. The pellet subjected to solvent treatment was ground with a cutter mill. The ground product was further jet-milled (6 passes). Jet milling was carried out using NanoJetmizer NJ50 (Aishin Nano Technologies, Co., Ltd.). The milling condition was as follows: pressing pressure=1.3 to 1.5 MPa, and milling pressure=1.0 to 1.35 MPa. The resultant powder was measured for particle diameter. The measured value is given in Table 1.

Example 2

A powder of poly(4-methyl-1-pentene) (Mitsui Chemicals, Inc., trade name: TPX, brand name: DX810UP, melting point: 233° C., MFR: 5 [g/10 min] (ASTM-D1238, 260° C., 5 kg load) was prepared (particle diameter: about 300 μm).

The powder was subjected to solvent treatment by immersing the same into methylcycloliexane of room temperature for 4 hours. The powder subjected to solvent treatment was jet-milled (2 passes). Jet milling was carried out in the same manner as in Example 1. The resultant powder was measured for particle diameter. The measured value is given in Table 1.

Example 3

A mixture of machining chips and pellet generated during production of poly(4-methyl-1-pentene) (Mitsui Chemicals, Inc., trade name: TPX, melting point: about 233° C., MFR: about 1-200 [g/10 min] (ASTM-D1238, 260° C., 5 kg load) was prepared (particle diameter: about 1 μm to about 3 mm).

The mixture of machining chips and pellet was sieved with 850 μm mesh. The sieved product was jet-milled (3 passes). Jet milling was carried out in the same manner as in Example 1. The resultant powder was measured for particle diameter, The measured value is given in Table 1.

Comparative Example 1

The pellet prepared in Example 1 ($D_{50}$=3 mm) was jet-milled (1 pass) without subjecting the same to pre-treatment (solvent treatment and cutter milling). The resultant powder was measured for particle diameter. The measured value is given in Table 1.

Comparative Example 2

The powder prepared in Example 2 ($D_{50}$=300 μm) was jet-milled (3 passes) without subjecting the same to pre-treatment (solvent treatment). The resultant powder was measured for particle diameter. The measured value is given in Table 1.

[Measurement of Particle Size Distribution]

Figure 4:
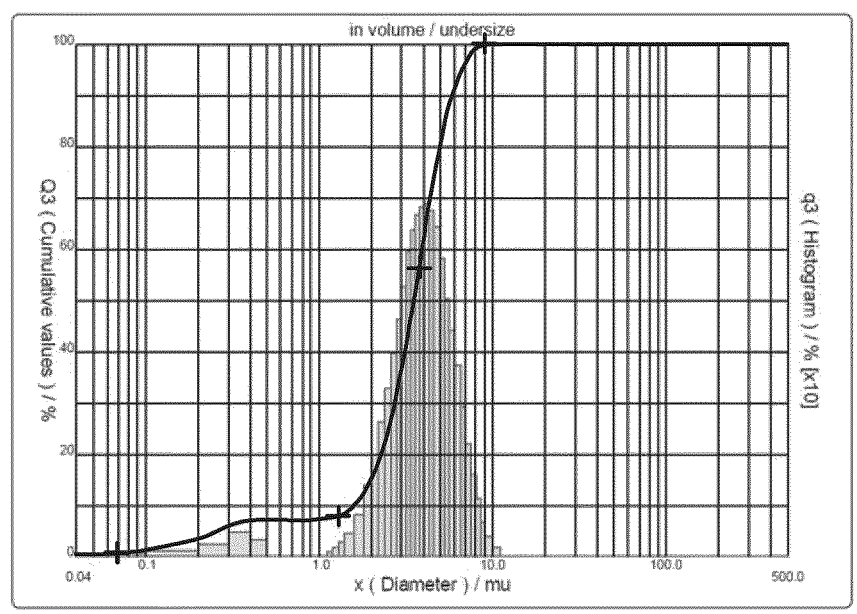
FIG. 4 is a graph of a particle size distribution of the powder prepared in Example 1 (where X axis is particle diameter, Y axis (right) is frequency in percent particles by count (see histogram), and Y axis (left) is cumulative frequency (see curve))
Figure 5:
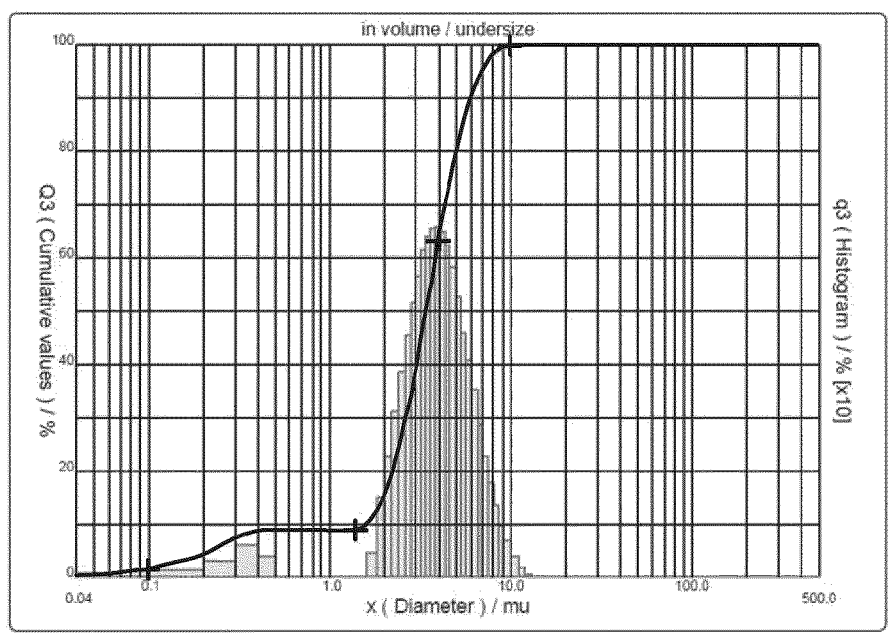
FIG. 5 is a graph of a particle size distribution of the powder prepared in Example 2 (where X axis is particle diameter, Y axis (right) is frequency in percent particles by count (see histogram), and Y axis (left) is cumulative frequency (see curve))
Figure 6:
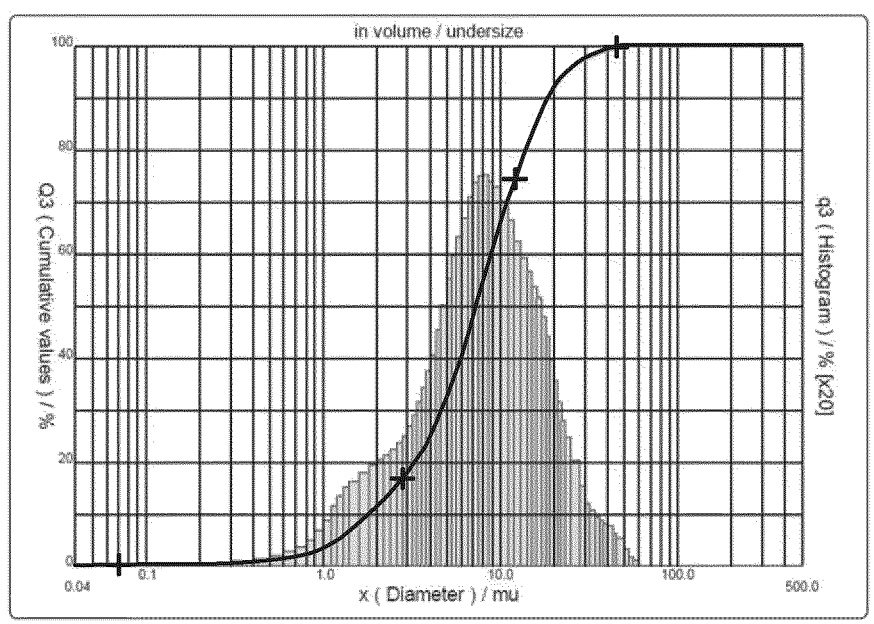
FIG. 6 is a graph of a particle size distribution of the powder prepared in Example 3 (where X axis is particle diameter, Y axis (right) is frequency in percent particles by count (see histogram), and Y axis (left) is cumulative frequency (see curve))

$D_{50}$ values for the powders prepared in Examples and Comparative Examples were measured in the manner described below. The powders were dispersed in aqueous solutions containing surfactant, and all the ground products were measured for particle diameter using a particle size analyzer (CILAS 1064, measurement range: 0.04 to 500 μm), measuring mean particle diameters $D_{50}$. As described above, mean particle diameter $D_{50}$ is the median particle diameter at 50% in the cumulative distribution curve, i.e., the median particle diameter divides the particle population into two halves, one half having 50 wt % of the particle population and having larger diameters than the median particle diameter, and the other half having 50 wt % of the particle population and having smaller diameter than the median particle diameter. The powders prepared in Examples 1 to 3 were measured for particle size distribution in the same manner. The particle size distributions are shown in FIG. 4 (for Example 1), FIG. 5 (for Example 2) and FIG. 6 (for Example 3).

[Morphology Observation]

Figure 2:
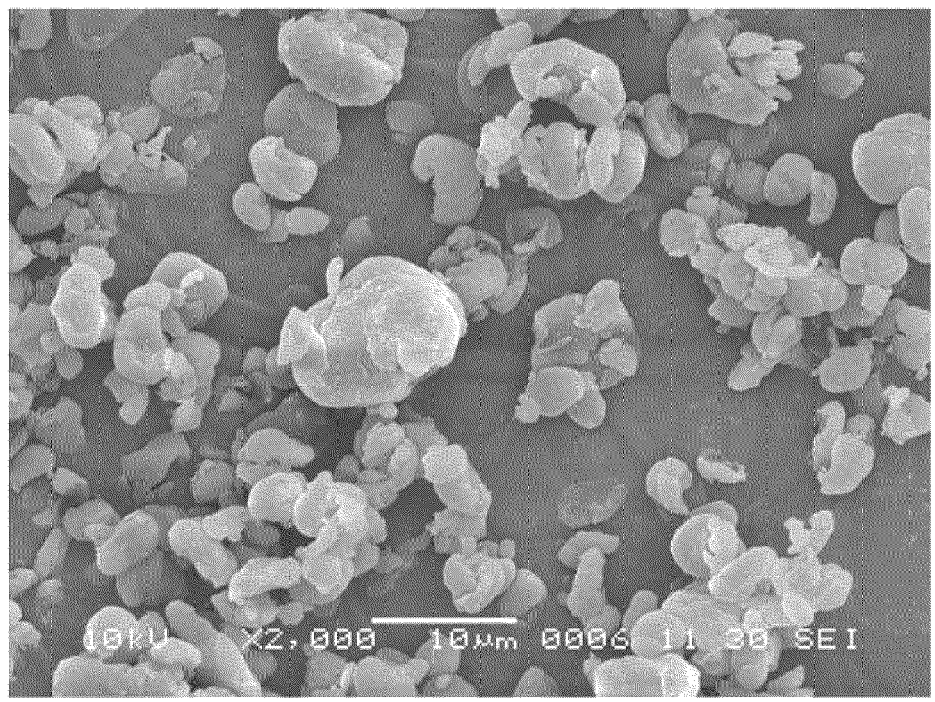
FIG. 2 is an SEM image (×2,000) of fine TPX particles prepared in Example 2.
Figure 3:
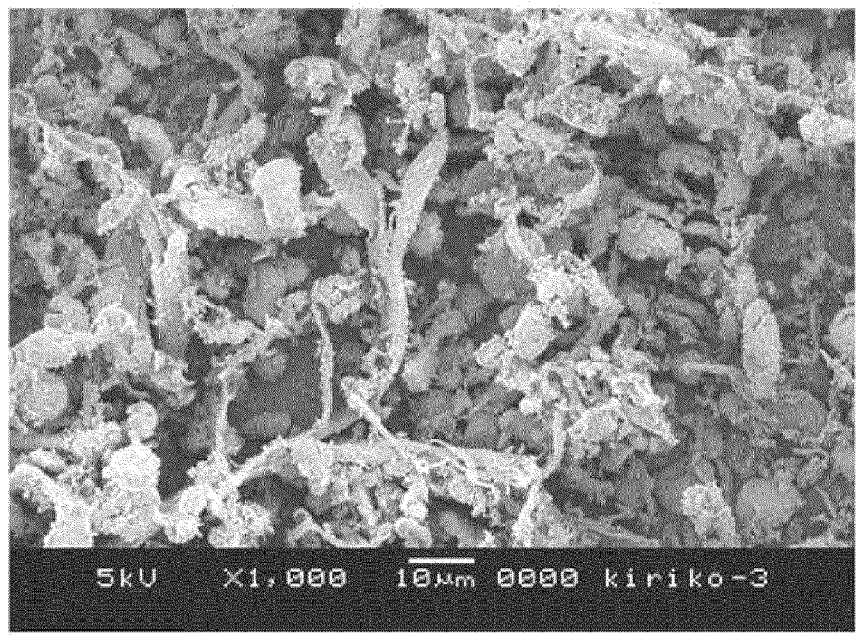
FIG. 3 is an SEM image (×1,000) of fine TPX particles prepared in Example 3.

The morphology of powder particles after jet milling was observed with a scanning electron microscope (JSM6380, JEOL Ltd.) SEM images of powder particles of Examples 1 to 3 are shown in FIGS. 1 to 3, respectively.

TABLE 1

Final particle diameters of fine TPX particles based on different combinations of TPX raw material forms and milling processes

| | Ex. 1 | Ex. 2 | Ex. 3 | Comp. Ex. 1 | Comp. Ex. 2 |
|---|---|---|---|---|---|
| Raw material form | Pellet | Powder | Chip/Pellet | Pellet | Powder |
| Raw material particle size | $D_{50}$ = 3 mm | $D_{50}$ = 300 μm | 1 μm to 3 mm | $D_{50}$ = 3 mm | $D_{50}$ = 300 μm |
| Pre-treatment | Solvent treatment followed by cutter milling | Only Solvent treatment | Only Sieving (850 μm mesh) | No pre-treatment | No pre-treatment |
| Raw material particle size after pre-treatment | $D_{50}$ = 76 μm | $D_{50}$ = 113 μm | $D_{50}$ = 35 μm | $D_{50}$ = 3 mm | $D_{50}$ = 300 μm |
| Number of passes of jet milling | 6 | 2 | 3 | 1 | 3 |
| Final particle diameter | $D_{50}$ = 4 μm | $D_{50}$ = 3 μm | $D_{50}$ = 7 μm | Grinding failed | $D_{50}$ = 211 μm |

In Example 1, the 4-methyl-1-pentene polymer pellet was subjected to pre-treatments (solvent treatment followed by cutter milling), yielding a raw material of 76 μm particle diameter. Jet milling was then performed (6 pass) to yield sank-like fine particles as shown in FIG. 1, which had an average particle diameter of 4 μm. In Comparative Example 1, on the other hand, jet milling of a resin pellet identical to that prepared in Example 1 was attempted without performing pre-treatment, but to no avail.

In Example 2, the 4-methyl-1-pentene polymer powder was subjected to solvent treatment, yielding a raw material of 113 μm particle diameter. Jet milling was then performed (2 pass) to yield sank-like fine particles as shown in FIG. 2, which had an average particle diameter of 3 μm. Also in Comparative Example 2, jet milling of the powder identical to that prepared in Example 2 was attempted; however, the powder was not fully ground, only yielding ground particles with an average particle diameter of 211 μm.

These results reveal that it is important that jet milling be preceded by pre-treatment such as solvent treatment, in order to produce fine powder of 4-methyl-1-pentene polymer.

Machining chips generated during production of 4-methyl-1-pentene polymers appear as a mixture of pellets and irregularly-shaped chips, and therefore was sieved with 850 μm mesh. The particle diameter of the sieved raw material was 35 μm. Jet milling was then performed (3 pass) to yield acicular or branched fine particles as shown in FIG. 3, which had an average particle size of 7 μm in length.

Example 4

A 500-ml side-arm flask was charged with 150 g of 4-methyl-1-pentene homopolymer having an intrinsic viscosity [η] of 2.9 dL/g, and heated to 358° C. on a sand bath under nitrogen stream. After confirming the melting of the polymer adhered to the interior wall of the flask, stirring was continued for 2 hours while holding the temperature for pyrolysis of the 4-methyl-1-pentene polymer. Cooling to normal temperature yielded oligomers (4MP1 oligomers) having an intrinsic viscosity [η] of 0.20 dL/g. Number-average molecular weight Mn, weight-average molecular weight Mw, molecular weight distribution Mw/Mn, melting point, critical surface tension etc., of the oligomers are given in Table 2.

The oligomers were ground using a single track jet mill (STJ-200, Seishin Enterprise Co., Ltd.) at a throughput of 2 kg/h. The ground product had a $D_{50}$ of 2.5 μm.

Example 5

A 500-ml side-arm flask was charged with 150 g of 4-methyl-1-pentene polymer (DX820, Mitsui Chemicals, Inc.), and heated to 357° C. on a sand bath under nitrogen stream. After confirming the melting of the polymer adhered to the interior wall of the flask, stirring was continued for 2 hours while holding the temperature for pyrolysis of the 4-methyl-1-pentene polymer. Cooling to normal temperature yielded oligomers (4MP1 oligomers) having an intrinsic viscosity [η] of 0.23 dL/g. Number-average molecular weight Mn, weight-average molecular weight Mw, molecular weight distribution Mw/Mn, melting point, critical surface tension etc., of the oligomer are given in Table 2.

The oligomers were ground using a single track jet mill (STJ-200, Seishin Enterprise Co., Ltd.) at a throughput of 5 kg/h. The grinding was repeated 2 times. The ground product had a $D_{50}$ of 3.6 μm.

Comparative Example 3

A fine powder of ethylene-bis-stearylamide (SLIPAX EK, Nippon Kasei Chemical Co., Ltd.) was prepared. The melting point and $D_{50}$ are given in Table 2.

The parameters for Examples 4 and 5 and Comparative Example 3 were measured in the manners described below.

[Oligomer Composition]

The oligomer composition was determined by $^{13}$C-NMR spectrum analysis.

[Intrinsic Viscosity [η]]

Measurement was made at 135° C. using decalin as solvent. Sample (about 20 g) was dissolved in decalin (15 ml), and specific viscosity ηsp was measured in a 135° C. oil bath. The decalin solution was diluted by the addition of another 5 ml of decalin, followed by measurement of specific viscosity ηsp in the same manner. This dilution procedure was repeated 2 times. A value of specific viscosity divided by concentration, extrapolated to zero concentration, was defined as the intrinsic viscosity.

$$[η]=\lim (ηsp/C) (C→0 \text{ [molecular weight]})$$

[Molecular Weight Distribution]

The ratio of weight-average molecular weight (Mw) to number-average molecular weight (Mn), (Mw/Mn), was found by GPC. Measurement was made under the conditions described below. Weight-average molecular weight (Mw) and number-average molecular weight (Mn) were measured by GPC calibrated with commercially-available monodisperse polystyrene standards, while using the molecular weight conversion scheme described below.

Instrument: Gel permeation chromatograph Alliance GPC 2000 (Waters)
Solvent: o-dichlorobenzene
Column: TSKgel (Toso Company, Ltd.) (×4)
Flow rate: 1.0 ml/min
Sample: 0.15 mg/ml in o-dichlorobenzene
Temperature: 140° C.

Molecular weight conversion: PS conversion/universal calibration method

For the construction of a universal calibration curve, the following Mark-Houwink coefficients were applied:

Mark-Houwink coefficients for polystyrene (PS): KPS=1.38×10$^{-4}$, aPS=0.70

[Melting Point]

Using a differential scanning calorimeter (DSC), an aluminum pan loaded with sample (about 5 mg) was heated to 280° C., retained at 280° C. for 5 minutes, cooled to 30° C. at a cooling rate of 10° C./min, retained at 30° C. for 5 minutes, and heated at a heating rate of 10° C./min to obtain a DSC curve. An endothermic peak in the DSC curve was defined as the melting point.

[Critical Surface Tension]

Using an image processing type solid-liquid interface analysis system (Dropmaster500, Kyowa Interface Science Co, Ltd.) at 23° C. and 50% RH, a series of 4 test liquids with known surface tension (mixture of ethyleneglycol monoethyl ether and formamide, having surface tensions of 31, 34, 37 and 40 mN/m, respectively) were dropped on the surface of a test sample for the measurement of contact angle.

The measurements of contact angle were carried out for five test samples for every Example or Comparative Example, and mean contact angle of the five test samples was calculated. The cosine of the mean contact angle θ (y-axis) was plotted against the surface tension of the test liquid (x-axis). The critical surface tension (mN/m) was defined as a surface tension at a point corresponding to the intercept of the horizontal line, cos θ=1, with a straight-line plot of cos θ against surface tension, which is obtained by the least squares method.

The test samples used for the measurement of critical surface tension were prepared by casting the 4-methyl-1-pentene polymer on a SUS plate. The 4-methyl-1-pentene polymer cast on the SUS plate was heated for melting at 250° C. for 5 minutes in a nitrogen atmosphere, and cooled to normal temperature for solidification. The surfaces of the test samples were measured for critical surface tension.

[Measurement of Particle Size Distribution]

Figure 7:
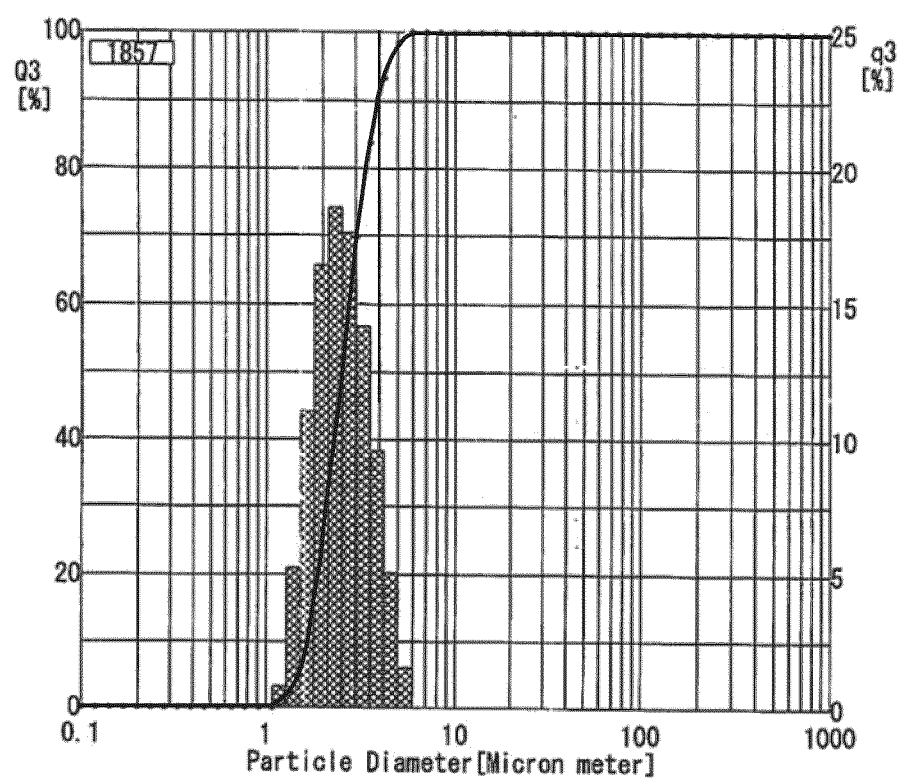
FIG. 7 is a graph of a particle size distribution of the powder prepared in Example 4 (where X axis is particle diameter, Y axis (right) is frequency in percent particles by count (see histogram), and Y axis (left) is cumulative frequency (see curve))
Figure 8:
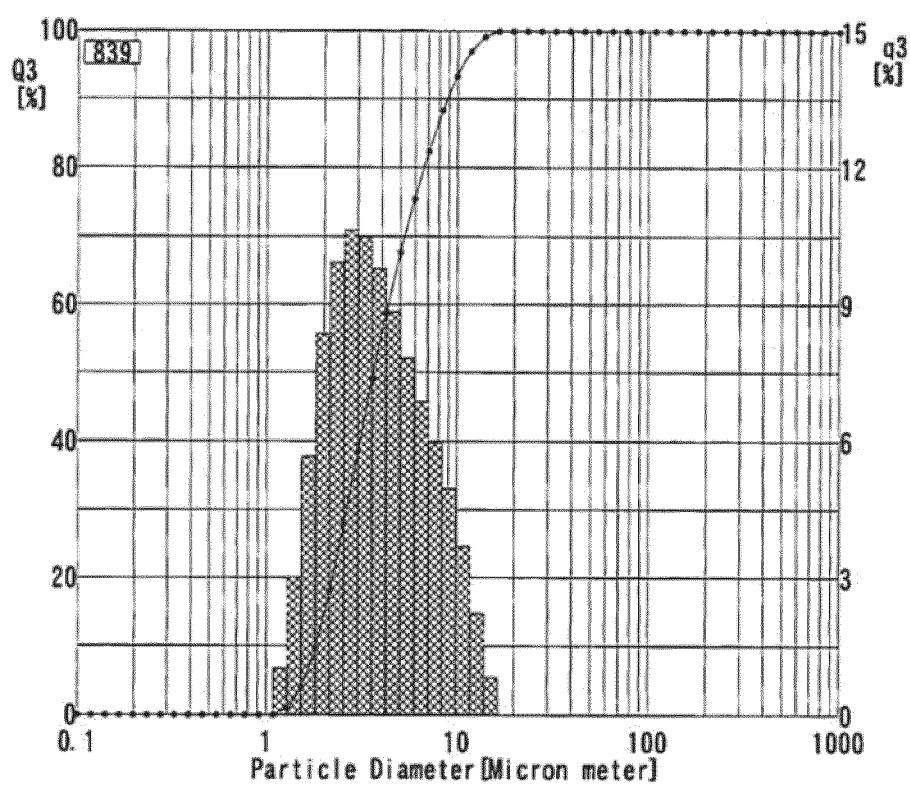
FIG. 8 is a graph of a particle size distribution of the powder prepared in Example 5 (where X axis is particle diameter, Y axis (right) is frequency in percent particles by count (see histogram), and Y axis (left) is cumulative frequency (see curve)).

The $D_{50}$ and particle size distribution of the powders prepared in Examples 4 and 5 were measured by a laser diffraction/scattering particle size analyzer (LMS-30, Seishin Enterprise Co., Ltd., measurement range: 0.1 to 1,000 μm) in aqueous dispersions containing surfactant. The particle size distributions of the powders prepared in Examples 4 and 5 are shown in FIG. 7 (for Example 4) and FIG. 8 (for Example 5).

The $D_{50}$ of the powder prepared in Comparative Example 3 was measured by a laser diffraction/scattering particle size analyzer (Microtrack HRA, Nikkiso Co., Ltd., measurement range: 0.1 to 700 μm) in an aqueous dispersion containing surfactant.

[Angle of Repose]

Angle of repose was measured according to JIS R 9301.

TABLE 2

|  | Ex. 4 | Ex. 5 | Comp. Ex. 3 |
|---|---|---|---|
| Oligomer composition | 4MP1 oligomer (4MP1 content: 100 wt %) | 4 MP1 oligomer (4MP1 content: 95.5 wt %, C10 content: 4.5 wt %) | Ethylene-bis-stearylamide |
| intrinsic viscosity [η] dL/g | 0.20 | 0.23 | |
| Mn | 8,810 | 7,060 | |
| Mw | 23,100 | 2,8900 | |

TABLE 2-continued

|  | Ex. 4 | Ex. 5 | Comp. Ex. 3 |
|---|---|---|---|
| Mw/Mn | 2.62 | 4.10 |  |
| Melting point (° C.) | 228 | 222 | 146 |
| Critical surface tension (mN/m) | 26.1 | 25.7 |  |
| Grinding method | Jet mill | Jet mill |  |
| Throughput per pass (kg/h) | 2 | 5 |  |
| Number of passes | 1 | 2 |  |
| Mean particle diameter $D_{50}$ (μm) | 2.5 | 3.6 | 4.1 |
| Angle of repose (°) | 40 | 45 | 50 |

As shown in Table 2, the oligomers of the 4-methyl-1-pentene polymers prepared in Examples 4 and 5 were successfully jet-milled into fine powders having a $D_{50}$ of 2.5 μm and 3.6 μm, respectively, without pre-treatment.

Moreover, as shown in Table 2, the oligomers of the 4-methyl-1-pentene polymers prepared in Examples 4 and 5 showed small angles of repose compared to powdery ethylene-bis-stearylamide of comparable size. Namely, the fine resin powder of the present invention has high flowability despite its relatively small particle diameter.

This application claims the priority of Japanese Patent Application No. 2010-104310 filed on Apr. 28, 2010 and U.S. 61/368,420 filed on Jul. 28, 2010, the content of which is incorporated herein by reference in their entirety.

INDUSTRIAL APPLICABILITY

The fine resin powder of the present invention may be used as an additive to various compositions by making effective use of the properties of 4-methyl-1-pentene polymers. For example, for their low surface tension, the fine resin powder may be used as a lubricant, and for their relatively high melting point compared to other polyolefins, the fine resin powder may be used as a wax for ink compositions for which high heat-set temperature is used.

The invention claimed is:

1. A composition comprising:
    (A) 0.1 to 150 weight parts of a fine resin powder in a dry form, wherein the fine resin powder is composed of a 4-methyl-1-pentene polymer having an intrinsic viscosity [η] ranging from $1.0\times10^{-2}$ to less than $5.0\times10^{-1}$ dl/g as measured in decalin at 135° C., and has a mean particle diameter $D_{50}$ ranging from $1.0\times10^{-1}$ to $5.0\times10$ μm; and
    (B) 100 weight parts of at least one sinterable powder selected from the group consisting of metal powder and ceramic powder.

2. The composition according to claim 1, further comprising (C) 5 to 200 weight parts of a plasticizing binder.

3. A method of producing a porous sintered body, comprising:
    extrusion molding the composition according to claim 1 into a molded article;
    heating the molded article to gasify or decompose the fine resin powder; and
    sintering the molded article.

4. The method according to claim 3, wherein the porous sintered body is a honeycomb filter.

5. A paint comprising:
    a fine resin powder in a dry form, wherein the fine resin powder is composed of a 4-methyl-1-pentene polymer having an intrinsic viscosity [η] ranging from $1.0\times10^{-2}$ to less than $5.0\times10^{-1}$ dl/g as measured in decalin at 135° C., and has a mean particle diameter $D_{50}$ ranging from $1.0\times10^{-1}$ to $5.0\times10$ μm,
    a matrix resin,
    an organic solvent, and
    a colorant.

6. An ink comprising:
    a fine resin powder in a dry form, wherein the fine resin powder is composed of a 4-methyl-1-pentene polymer having an intrinsic viscosity [η] ranging from $1.0\times10^{-2}$ to less than $5.0\times10^{-1}$ dl/g as measured in decalin at 135° C., and has a mean particle diameter $D_{50}$ ranging from $1.0\times10^{-1}$ to $5.0\times10$ μm,
    a matrix resin,
    an organic solvent, and
    a colorant.

* * * * *